July 16, 1968
A. K. BARSTOW ET AL  3,393,288
APPARATUS FOR WELDING MINIATURE AND MICRO-MINIATURE
ELECTRONIC COMPONENTS
Filed Oct. 16, 1964  3 Sheets-Sheet 3
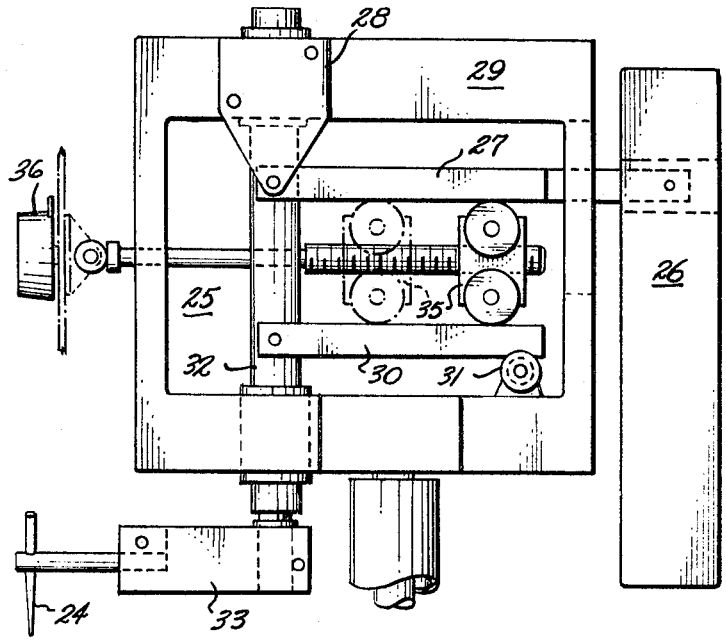
Fig. 3.
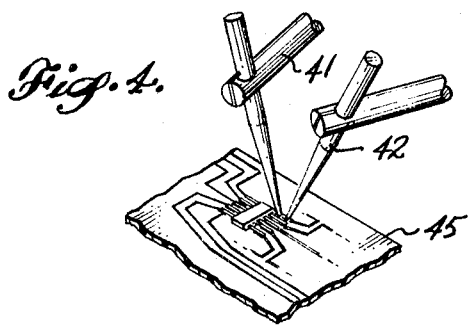
Fig. 4.
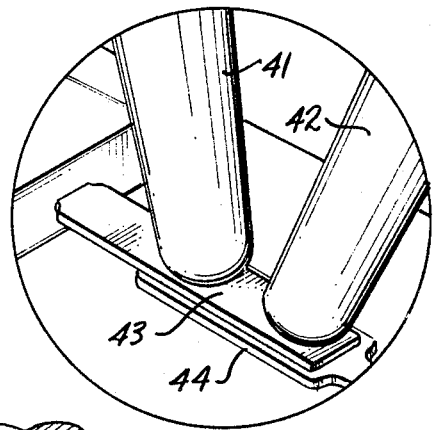
Fig. 5.
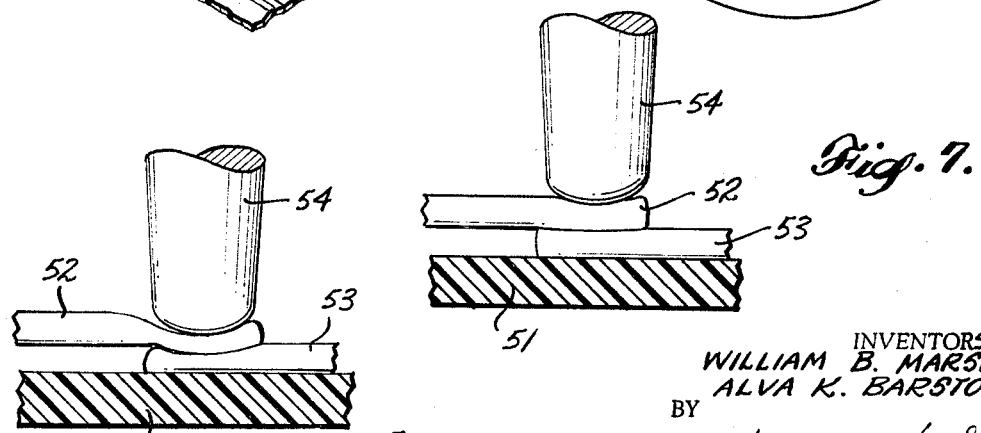
Fig. 7.
Fig. 6.
INVENTORS
WILLIAM B. MARSH
ALVA K. BARSTOW
BY
Nicolas de Vogel
AGENT United States Patent Office 3,393,288
Patented July 16, 1968

3,393,288
APPARATUS FOR WELDING MINIATURE
AND MICRO-MINIATURE ELECTRONIC
COMPONENTS
Alva K. Barstow, Kent, and William B. Marsh, Seattle,
Wash., assignors to The Boeing Company, Seattle,
Wash., a corporation of Delaware
Filed Oct. 16, 1964, Ser. No. 404,312
2 Claims. (Cl. 219—89)

ABSTRACT OF THE DISCLOSURE

An apparatus for welding miniature and micro-miniature electronic components. The apparatus employs a horizontal base member for supporting elements to be welded and a vertical support column mounted on the base member for slidably mounting a welding mechanism thereon. Power operable means are connected to the welding mechanism for raising and lowering the same. The welding mechanism includes electrode support means having a pair of welding electrodes mounted therein with a weighting arrangement connected to the electrode support means for biasing the electrodes downwardly with a variable predetermined force.

---

This invention relates to a method and apparatus for welding miniature and micro-miniature electronic components and in particular to the welding of two or more materials of minute over-all dimensions. Recent progress in the miniaturization of electronics has led to the need for improved joining methods.

Typical of the developments which present new joining problems are the tiny integrated circuits which must be jointed electrically to interconnecting circuits, the small dot components, tiny circuits deposited on insulating substrates such as circuit boards, and other devices such as solar cells. Due to the very small size, the spacing of connecting leads becomes so close that ordinary methods are difficult if not impossible. When soldering is attempted the space between the connections is so close that the solder frequently bridges the gap and shorts out the connection. Conventional resistance welding cannot be attempted because the insulating mediums will not transmit the welding pulse.

Because of the increasing interest in electronics in miniature and micro-miniature electronic devices, several small welding apparatus are used in the industry. However, all of the apparatus are based on typical spot welding type of construction where the electrode force is determined by a spring load. It has been proven by experience that the welds performed by the aforementioned type of welding apparatus did not produce a consistent weld. The principal disadvantage of those welding apparatus lies in the inconsistencies and inaccuracies inherent in the spring used to provide the pressure force to the electrodes. The present invention overcomes this disadvantage by using instead of a spring configuration a different type of electrode pressure which is solely dependent on a weight arrangement, and it was noted, that the following advantages were achieved:

(1) more consistent electrode force,
(2) deformation which was otherwise created by the spring pressure of the existing devices was reduced by the slow follow-up of the electrode pressure,
(3) reliability of the welding apparatus was improved,
(4) control by weights is accurate and economical and avoids the need for matching and calibrating spring pressures for each weld at each time,
(5) the weld between the two or more materials showed a complete fusion of the joints, thus increasing the reliability of the weld.

Furthermore, the present invention provides a unique method for welding parts or in connecting materials from one point to another when the nature of the assembly allows welding, brazing or soldering from only one side of the assembly such as in a circuit card where the interconnecting circuitry is attached to an insulating medium consisting of a dielectric composed of a plastic laminate or ceramic substrate or similar material. The technique involves the use of two electrodes on the same side of the area to be welded, utilizing the electrical resistance between the electrodes to affect the junction, similar in many respects to the resistance welds performed between sheets of metal in typical spot welds.

Because the present invention uses weights to apply pressure to the point of contact of the two electrodes rather than springs, a complete freedom of the electrodes to operate independently of each other is provided and the differences and variations of material thicknesses can be taken into account. The uniformity and independence of the electrode pressure prevents blown-joints or destroyed joints caused by material variations.

The use of weights also eliminates the need for matching and calibrating the pressure to be applied to the weld area, each time the weld head is to be used for a new setting.

A very significant benefit is the fact that no override of pressure is possible, since only the pressure of the weights can be applied, and this can be as precise as weights can be measured. The inherent precision control of pressure and energy makes this method ideal for soldering, welding or brazing very small components. The slow follow-up of the weight system, in comparison with the spring system, makes it especially useful for soft materials which need more time to develop a bond.

It is therefore an object of the present invention to provide an apparatus that will perform a reliable weld and prevent harmful deformation of materials in delicate and miniature equipment.

It is another object of this invention to provide a method of welding wherein a predetermined pressure on the electrodes is provided by a certain amount of weight applied thereto after the electrodes are put in contact with the materials to be welded.

It is another object of this invention to provide a welding apparatus that through its slow follow-up pressure on its electrodes upon the materials to be welded, prevents harmful deformation which is especially valuable where soft or thin materials, such as foils, etc. are involved.

Other objects of the invention will become apparent from the following description taken in conjunction with the accompanying drawings in which:

FIGURE 3 shows a side view of the preferred apparatus as illustrated in FIGURE 2 above and the mechanism for adjusting the amount of weight pressure for one electrode.

FIGURE 4 shows how the apparatus is applied to micro-miniature electronic circuits.

FIGURE 5 shows the view which is observed by the welding operator through the magnifying viewing apparatus such as shown attached to the basic welding apparatus illustrated in FIGURE 1.

FIGURE 6 shows a typical weld of two materials which were jointed by conventional welding apparatus using spring pressure on its electrodes.

FIGURE 7 shows the weld of two materials performed by the present disclosed apparatus and shows the reduced amount of deformation in comparison with the illustration in FIGURE 6.

Figure 1:
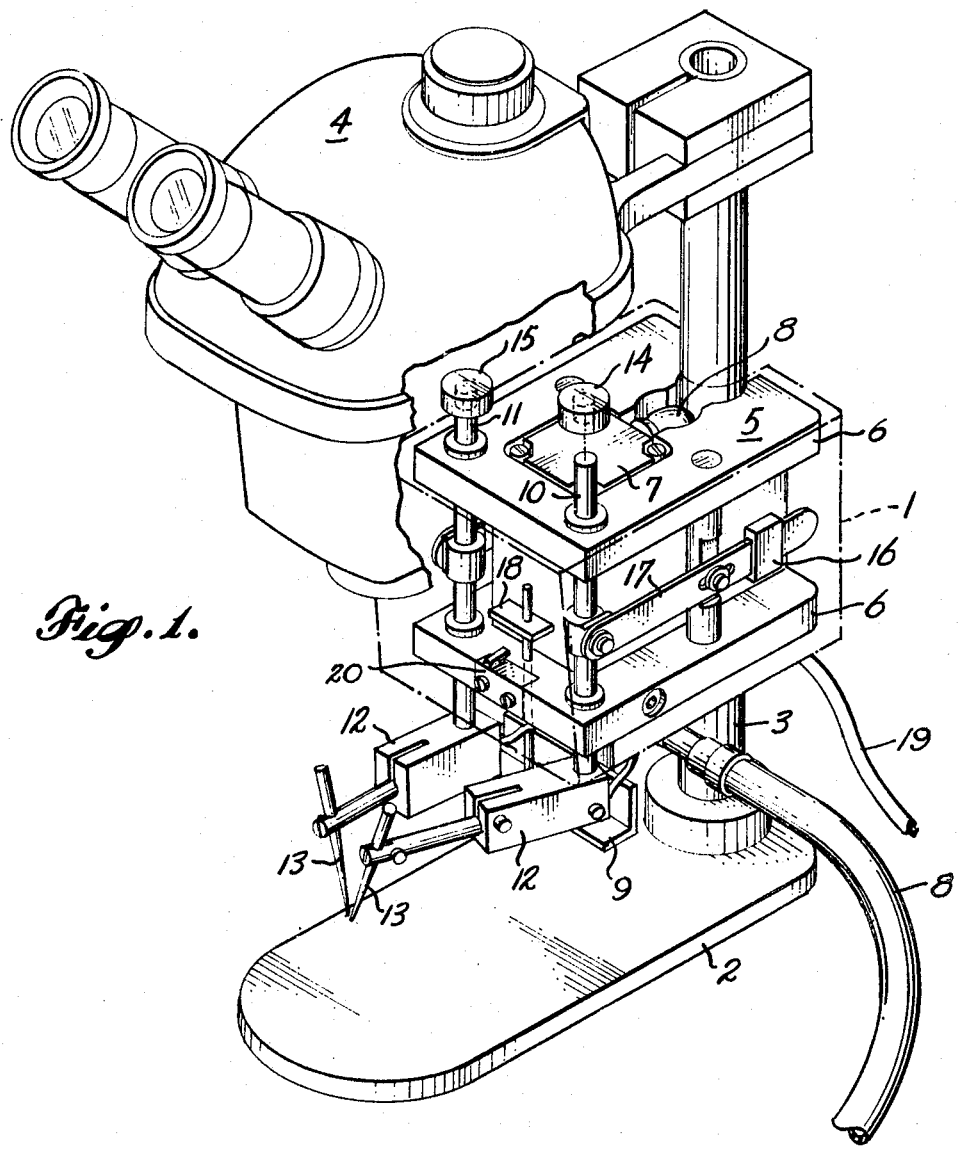
FIGURE 1 shows, in isometric fashion, a welding apparatus and its basic mechanical construction.

Referring now to the drawings there is shown in FIGURE 1 a welding apparatus 1 for welding, brazing or soldering miniature and micro-miniature electronic components. The welding apparatus 1 comprises a base 2 having a vertical support 3 and a magnifying viewing apparatus 4, essential for the operation of welding the micro-miniature component.

The mechanism 5 of the welding apparatus 1 is mounted on the vertical support 3 by horizontal extending support means 6. The mechanism 5 comprises a hydraulic actuating means 7 which is connected to a foot pedal (not shown) through hydraulic hose 8 and when the foot pedal is depressed the actuator means 7 will slowly lower the electrode support means or bracket 9. Two substantially vertical slideable shafts 10 and 11 are carried by the horizontal support means 6 and each shaft is provided with a calmping device 12 for holding a welding electrode 13. Weights 14 and 15 are inserted on top of the shafts 10 and 11 respectively, in order to provide the required amount of pressure to the welding electrodes 13.

For weight adjusting purposes counterweights 16, slideably carried by pivotally mounted lever means 17, are pivotally mounted on each of the free moving shafts 10 and 11.

Each welding electrode 13 is electrically connected via electrical leads to an electrical switching means (not shown) and then to an electrical power source (not shown) by the cable 19. When the actuator means 7 is actuated and moves the bracket 9 in a downward position a microswitch 20 will be closed by a tripping means 18 which is mounted on the bracket 9 and accordingly this microswitch 20 will close the electrical circuit in the power supply (not shown) so that electrical power will be supplied to the welding electrodes 13, after the electrodes 13 are brought in contact with the work piece to be welded. When the foot pedal is released the hydraulic actuator means 7 will move bracket 9 in an upward direction and thereby lift the electrodes 13 away from the welded work piece.

Figure 2:
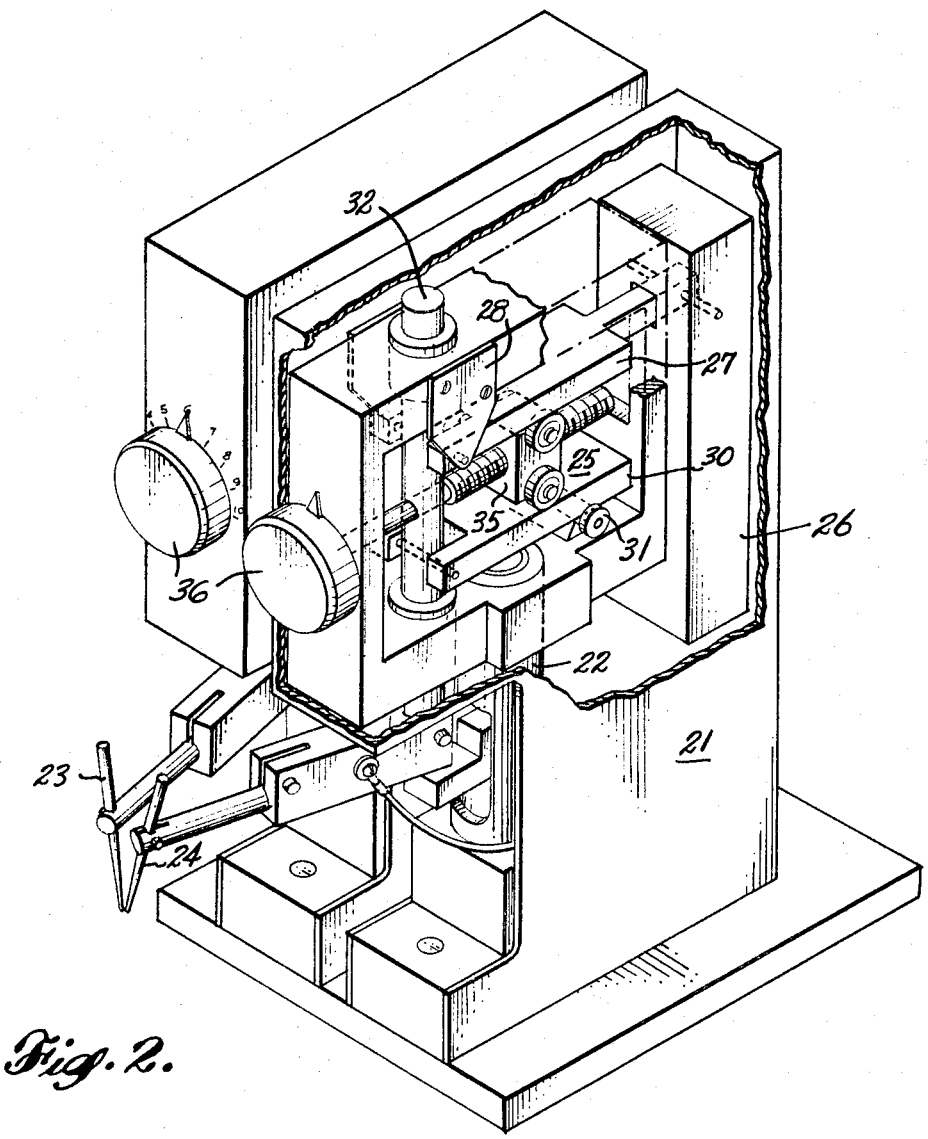
FIGURE 2 shows, in isometric fashion, another embodiment of the welding apparatus wherein the weight pressure can be accurately controlled by the shown mechanism. The magnifying viewing apparatus as shown in FIGURE 1 is omitted.

FIGURE 2 shows a welding apparatus 21 which is provided with substantially the same type of hydraulic means 22 for lowering the electrodes 23 and 24. Electrical means are provided to supply the electrical power to the electrodes after the electrodes 23 and 24 are brought in contact with, and their full weight pressure is applied to, the electronic components to be welded.

The weight pressure for the electrodes 23 and 24 is provided by an adjustable weight mechanism 25. Referring to FIGURE 3, which shows the side view of the welding apparatus 21, a weight 26 is pivotally mounted on a first lever 27 which in turn is pivotally mounted on a support bracket 28 extending from the housing 29. A second lever 30 rests upon a seat 31 and is pivotally mounted to a free moving shaft 32 which carries an electrode holder 33 with electrode 24. An adjustable fulcrum 35 is slideably and adjustably arranged in between the first lever 27 and second lever 30 so that by setting the dial 36 to the desired weight required, the adjustable fulcrum 35 will travel to a certain point between the levers 27 and 30 which will then produce the amount of weight pressure on the electrode 24. A similar arrangement is provided for the second electrode 23.

In FIGURE 4 and FIGURE 5 the electrodes are brought in full contact with a micro-miniature electronic component lead 43 and fusion of the lead 43 with the edge lead 44 of the circuit board 45 is to be accomplished. The real size of the micro-miniature electronic component lead is approximately 0.003 inch thick x 0.010 inch wide and as shown in the illustration of FIGURE 5, a magnifying viewing apparatus 4 or other type of enlargement means is essential for this type of work.

In FIGURE 6 an insulation material 51 is shown with two materials 52 and 53 which are welded by the conventional spring pressure type welding apparatus.

In FIGURE 7 the insulation material 51 is shown with the same electrode 54, which is now attached to the present shown welding apparatus 1 or 21, as shown in FIGURE 1 and FIGURE 2. The weld between the two materials 52 and 53 shows to be more consistent and with less deformation than the prior art welding methods and apparatus as illustrated by the weld in FIGURE 6.

Having thus described the different parts and their function by reference numbers, the method and operation of the present invention is as follows:

The micro-miniature electronics component, or other micro-miniature material such as in solar cells, miniature module construction, tinfoil joints, etc., to be welded, are placed under the electrodes 13 of the welding apparatus shown in FIGURE 1 or under the electrodes 23 and 24 of the welding apparatus shown in FIGURE 2. Depending on the hardness of the materials a certain pressure should be applied by the electrode in order to make a reliable and consistent fusion thereof.

By experience it has been noted that, for example: thin gold plated Kovar and solder tinned copper requires ½ pound of pressure at the electrode tip; Kovar to nickel-ribbon requires 4 pounds; and tinned copper wire to tinned copper wire, 12 pounds. The precise amount of weight thus required will be applied to the electrodes.

The electrodes are then lowered and placed in the proper location where the welding should take place on the workpiece. The full weight will then be released to the electrode tip and slowly assert itself on the workpiece. In the prior art, the spring pressure was then released which resulted often in deformation and cracking of the materials to be welded.

The electrodes, now fully resting on the materials, will then be supplied with an electric pulse and the welding will take place.

It has been proven and tested that the weld obtained by this method and by this apparatus has been far more consistent and reliable, because a complete fusion of the material is achieved and deformation of the materials is kept to a minimum.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

We claim:
1. A welding apparatus comprising:
a substantially horizontal base member adapted to support elements to be welded;
a substantially vertical support column mounted on said base member;
a welding mechanism slidably mounted on said support column; and
power operable means operatively connected to said welding mechanism for raising and lowering said mechanism along said support column;
said welding mechanism comprising:
a support platform slidably mounted on said support column; said support platform including an upstanding fixed structure;
electrode support means mounted on said support platform; said electrode support means including an upstanding portion slidably mounted in said support platform for vertical sliding movement relative thereto;
a welding electrode mounted in said electrode support means; and a weighting arrangement connected to said electrode support means for biasing said electrode downwardly with a variable, predetermined force; said weighting arrangement comprising:
  an upper lever arm having an inner end pivotably connected to said upper portion of said electrode support means, an intermediate portion and an outer end;
  a weighted member connected to the outer end of said upper lever arm;
  a lower lever arm spaced downwardly from said upper lever arm; said lower lever arm including an inner end pivotably connected to said upstanding portion of said electrode support means, an intermediate portion and an outer end portion; said outer end portion being supported on said fixed structure of said support platform;
  a rod extending through said upstanding portion of said electrode support means and including a threaded portion extending between said upper and lower lever arms;
  a fulcrum member mounted on said threaded portion of said rod and movable therealong in response to rotational movement of said rod; said fulcrum member being in contact with both said upper and lower lever arms, whereby said weighted member on said outer end of said upper lever arm will exert greater force on said electrode support means as said fulcrum member moves closer to said upstanding portion of said electrode support means; and
  means for rotating said rod member to move said fulcrum member therealong.

2. A welding apparatus comprising:
  a substantially horizontal base member adapted to support elements to be welded;
  a substantially vertical support column mounted on said base member;
  a welding mechanism slidably mounted on said support column; and
  power operable means operatively connected to said welding mechanism for raising and lowering said mechanism along said support column;
said welding mechanism comprising:
  a support platform slidably mounted on said support column; said support platform including an upstanding fixed structure;
  electrode support means mounted on said support platform; said electrode support means including an upstanding portion slidably mounted in said support platform for vertical sliding movement relative thereto;
  a welding electrode mounted in said electrode support means; and
  a weighting arrangement connected to said electrode support means for biasing said electrode downwardly with a variable, predetermined force; said weighting arrangement comprising:
    a weighted member mounted on said upstanding portion of said electrode support means for urging said electrode support means downwardly;
    a counterweight arm including an inner end pivotably connected to said upstanding portion of said electrode support means, an intermediate portion and an outer end;
    means pivotably connecting the intermediate portion of said counterweight arm to said fixed structure on said support platform; and
    a counterweight slidably mounted on the outer end of said counterweight arm for biasing said electrode support means upwardly with a variable force to partially cancel the downward force created by said weighted member.

References Cited

UNITED STATES PATENTS

| | | | |
|---|---|---|---|
| 1,115,943 | 11/1914 | Knipe | 219—91 |
| 2,258,189 | 10/1941 | Meisner | 219—91 |
| 2,310,556 | 2/1943 | Strong | 219—86 |
| 2,452,009 | 10/1948 | Woodward | 219—86 |
| 3,140,381 | 7/1964 | Nybors | 219—86 |
| 3,207,884 | 9/1965 | Davis et al. | 219—86 |
| 3,234,354 | 2/1966 | Penberg | 219—86 |
| 3,263,057 | 7/1966 | Conti | 219—85 |
| 3,316,383 | 4/1967 | Hill | 219—86 |

RICHARD M. WOOD, *Primary Examiner.*

W. DEXTER BROOKS, *Assistant Examiner.*